United States Patent
Lai et al.

(10) Patent No.: US 9,825,703 B2
(45) Date of Patent: Nov. 21, 2017

(54) OPTICAL COMMUNICATION DEVICE AND CONTROL METHOD THEREOF

(71) Applicant: INDUSTRIAL TECHNOLOGY RESEARCH INSTITUTE, Hsinchu (TW)

(72) Inventors: Jyun-Liang Lai, Taichung (TW); Chueh-Hao Yu, Douliu (TW); Kai-Cheung Juang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 124 days.

(21) Appl. No.: 14/606,662

(22) Filed: Jan. 27, 2015

(65) Prior Publication Data

US 2016/0094291 A1 Mar. 31, 2016

(30) Foreign Application Priority Data

Sep. 26, 2014 (TW) .............................. 103133653 A

(51) Int. Cl.
*H04B 10/116* (2013.01)

(52) U.S. Cl.
CPC .................................. *H04B 10/116* (2013.01)

(58) Field of Classification Search
CPC ................ H04B 10/504; H04B 10/077; H04B 10/07955; H04B 10/502; H04B 10/564; H01S 5/068; H01S 5/06804; H01S 5/0683

(Continued)

(56) References Cited

U.S. PATENT DOCUMENTS 5,721,456 A * 2/1998 Kebukawa ........... H04B 10/503
257/83
5,847,856 A * 12/1998 Imai ................ H04B 10/07955
359/333

(Continued)

FOREIGN PATENT DOCUMENTS

CN 101222186 B 10/2010
CN 101938865 A 1/2011

(Continued)

OTHER PUBLICATIONS

Intellectual Property Office, Ministry of Economic Affairs, R.O.C., "Office Action", dated Dec. 15, 2015, Taiwan.

(Continued)

*Primary Examiner* — David Payne
*Assistant Examiner* — Tanya Motsinger
(74) *Attorney, Agent, or Firm* — Locke Lord LLP; Tim Tingkang Xia, Esq.

(57) ABSTRACT

An optical communication device and a control method thereof are provided. The optical communication device includes a driving module, a data transmission module, a light emitting module, and a feedback module. The driving module generates a driving current. The data transmission module generates a data current according to a piece of data. The light emitting module is electrically connected to the driving module and the data transmission module directly and emits visible light according to an illuminating current generated by combining the driving current with the data current. The feedback module adjusts a direct current (DC) potential of one of the driving current and the data current so as to make an average intensity of the visible light equal a preset intensity.

17 Claims, 12 Drawing Sheets

(58) Field of Classification Search
USPC .......................................... 398/182, 195, 198
See application file for complete search history.

(56) References Cited

U.S. PATENT DOCUMENTS

| | | | | |
|---|---|---|---|---|
| 6,414,974 | B1* | 7/2002 | Russell | H01S 5/0683 250/205 |
| 6,590,686 | B1* | 7/2003 | Sekiya | H04B 10/503 398/182 |
| 6,868,235 | B2* | 3/2005 | Tokita | H01S 5/02415 250/238 |
| 7,742,704 | B2* | 6/2010 | Suzuki | H04B 10/1141 398/182 |
| 8,145,067 | B2* | 3/2012 | Nagayama | G02F 1/0123 359/237 |
| 8,150,269 | B2 | 4/2012 | Sauerlander et al. | |
| 8,421,367 | B2 | 4/2013 | Tsai et al. | |
| 8,427,300 | B2 | 4/2013 | Covaro et al. | |
| 8,526,825 | B2 | 9/2013 | Yamada et al. | |
| 8,630,549 | B2* | 1/2014 | Kim | H04B 10/1141 398/172 |
| 8,989,227 | B1* | 3/2015 | Yang | H01S 5/0427 372/29.011 |
| 2002/0071163 | A1* | 6/2002 | Tokita | H04B 10/504 398/192 |
| 2002/0118424 | A1* | 8/2002 | Miki | H01S 5/068 398/192 |
| 2003/0012244 | A1* | 1/2003 | Krasulick | B82Y 20/00 372/50.1 |
| 2003/0030893 | A1* | 2/2003 | Cornelius | H01S 3/06754 359/341.4 |
| 2004/0008995 | A1* | 1/2004 | Ono | H04B 10/564 398/182 |
| 2004/0028099 | A1* | 2/2004 | Hongo | G02F 1/0123 372/38.02 |
| 2005/0069326 | A1* | 3/2005 | Onde | H04B 10/801 398/128 |
| 2006/0291510 | A1* | 12/2006 | Juluri | H01S 5/0683 372/29.021 |
| 2007/0160374 | A1* | 7/2007 | Matsui | H04B 10/504 398/195 |
| 2008/0080855 | A1* | 4/2008 | Komamaki | H04B 10/508 398/13 |
| 2008/0102893 | A1* | 5/2008 | Shin | H04M 1/7253 455/557 |
| 2009/0297167 | A1* | 12/2009 | Nakagawa | G09F 9/33 398/182 |
| 2010/0074629 | A1* | 3/2010 | Harada | H04B 10/2504 398/182 |
| 2010/0172654 | A1* | 7/2010 | Enami | H01S 5/042 398/183 |
| 2011/0222849 | A1* | 9/2011 | Han | H04B 10/1149 398/25 |
| 2012/0045221 | A1 | 2/2012 | Walewski | |
| 2014/0105610 | A1* | 4/2014 | Azadeh | H05B 33/0812 398/135 |
| 2014/0186026 | A1* | 7/2014 | Oshima | H04B 10/116 398/25 |

FOREIGN PATENT DOCUMENTS

| | | |
|---|---|---|
| CN | 102385834 A | 3/2012 |
| CN | 102768817 A | 11/2012 |
| CN | 103839953 A | 6/2014 |
| TW | 201115944 A | 5/2011 |
| TW | I381767 B | 1/2013 |
| TW | I430710 B | 3/2014 |

OTHER PUBLICATIONS

Jelena Grubor et al., Wireless high-speed data transmission with phosphorescent white-light LEDs, Optical Communication—Post-Deadline Papers (published 2008), 33rd European Conference and Exhibition of, 2007.

Hoa Le Minh et al., High-Speed Visible Light Communications using Multiple-Resonant Equalization, IEEE Photonics Technology Letters, 2008, 1243-1245, vol. 20, No. 14.

Hoa Le Minh et al., 80 Mbit/s visible light communications using pre-equalized white LED, ECOC, 2008, 1-2, vol. 5-223-224.

A. M. Khalid et al., 1-Gb/s transmission over a phosphorescent white LED by using rate-adaptive discrete multitone modulation, IEEE Photonics Journal, 2012, 1465-1473, vol. 4, No. 5.

J. Vučić et al., White Light Wireless Transmission at 200 Mb/s Net Data Rate by Use of Discrete-Multitone Modulation, IEEE Photonics Technology Letters, 2009, 1511-1513, vol. 21, No. 20.

Paul Anthony Haigh et al., Visible Light Communications: 170 Mb/s Using an Artificial Neural Network Equalizer in a Low Bandwidth White Light Configuration, Journal of Lightwave Technology, 2014, 1807-1813, vol. 32, No. 9.

Supertex inc "HV9910B", Universal High Brightness LED Drvier, 2010, 1-8.

* cited by examiner

OPTICAL COMMUNICATION DEVICE AND CONTROL METHOD THEREOF

CROSS-REFERENCE TO RELATED APPLICATIONS

This non-provisional application claims priority under 35 U.S.C. §119(a) on Patent Application No(s). 103133653 filed in Taiwan, R.O.C. on Sep. 26, 2014, the entire contents of which are hereby incorporated by reference.

TECHNICAL FIELD

The disclosure relates to an optical communication device and a control method thereof.

BACKGROUND

An optical communication system uses light to perform signal transmission. Moreover, visible light is widely applied to the indoor illumination. Therefore, the optical communication system having both the illumination function and the communication function could save energy and reduce the cost on the hardware equipment. However, it is very important to prevent users from sensing flickers when visible light is applied to perform the illumination function and the communication function.

SUMMARY

According to one or more embodiments, the disclosure provides an optical communication device. In one embodiment, the optical communication device includes a driving module, a data transmission module, a light emitting module, and a feedback module. The driving module outputs a driving current. The data transmission module generates a data current according to a piece of data. The light emitting module is electrically connected to the driving module and the data transmission module and emits visible light according to an illuminating current generated by combining the driving current and the data current. The feedback module adjusts a direct current (DC) potential of one of the driving current and the data current to set an average intensity of the visible light to be a preset intensity.

According to one or more embodiments, the disclosure provides an optical communication device control method. In one embodiment, the optical communication device control method includes the following steps. Generate a driving current. Generate a data current according to a piece of data. Drive a light emitting module by an illuminating current generated by combining the data current with the driving current, to emit visible light. Adjust a DC potential of one of the data current and the driving current to set an average intensity of the visible light to be a preset intensity.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
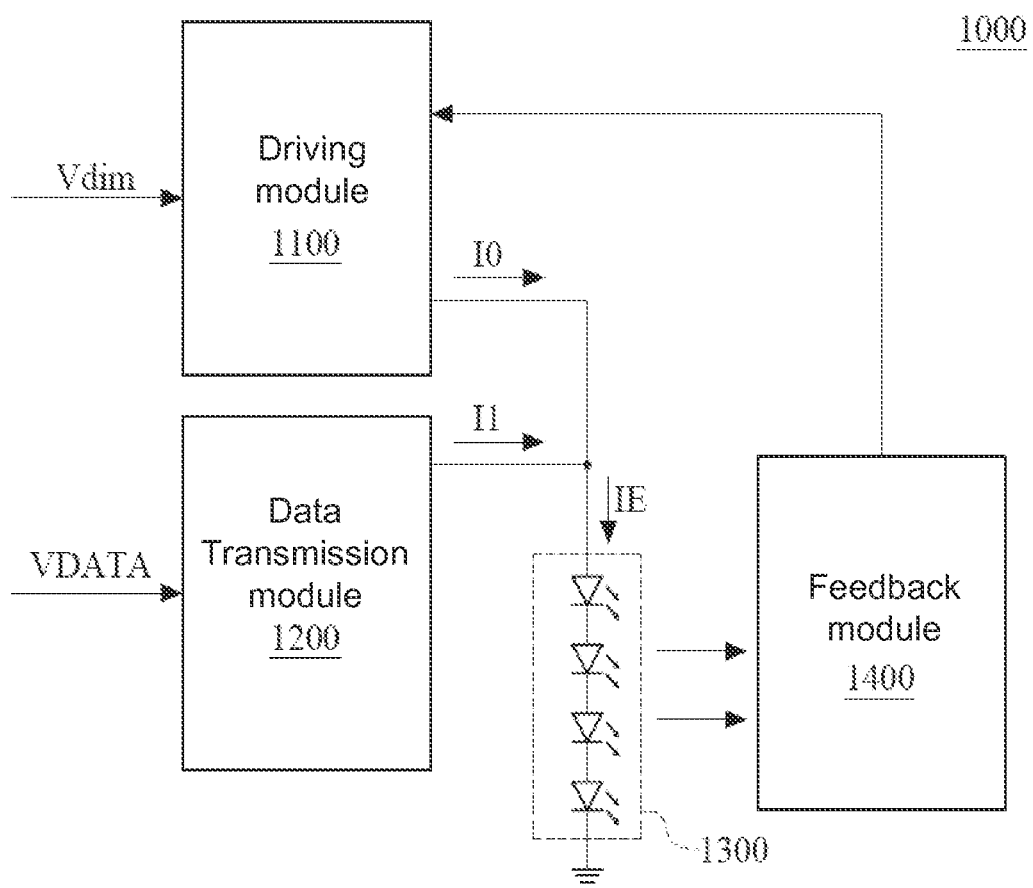
FIG. 1 is a functional block diagram of an embodiment of an optical communication device in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a functional block diagram of an embodiment of an optical communication device in the disclosure. The optical communication device 1000 includes a driving module 1100, a data transmission module 1200, a light emitting module 1300, and a feedback module 1400. The light emitting module 1300 is electrically connected to the driving module 1100 and the data transmission module 1200. The feedback module 1400 is electrically connected to the driving module 1100.

Figure 2A:
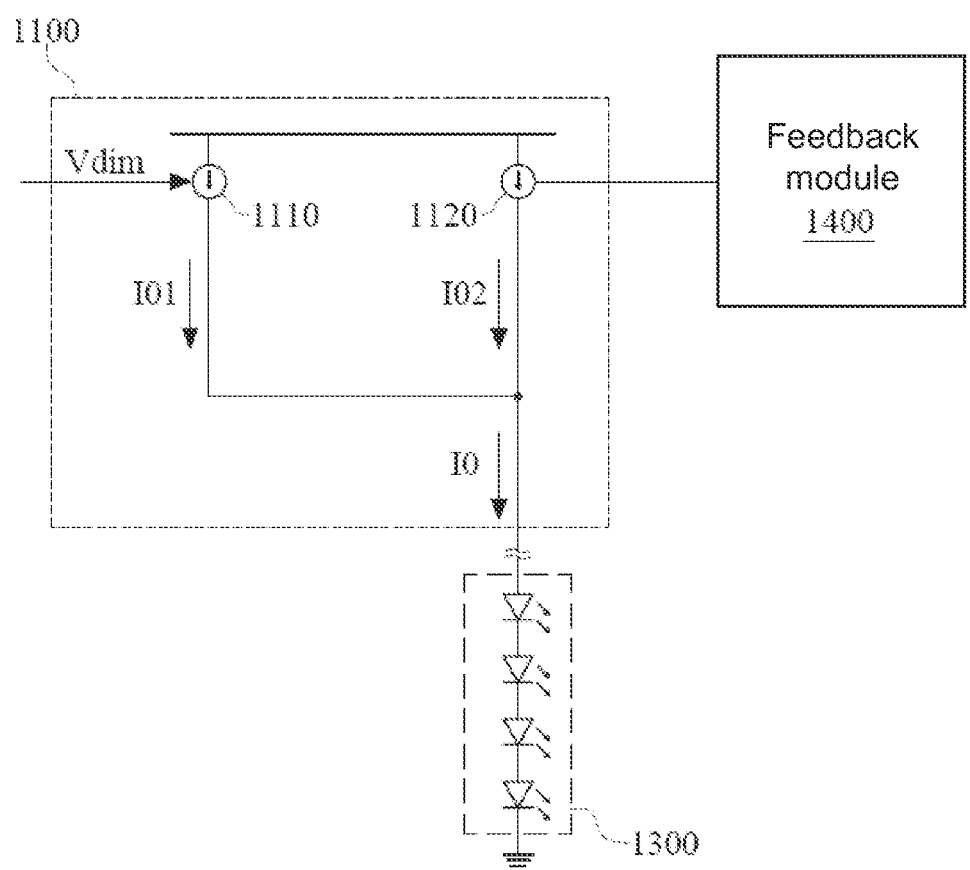
FIG. 2A is a schematic circuit of an embodiment of the driving module in FIG. 1.

The driving module 1100 outputs a driving current I0. The circuit of the driving module 1100 can be referred to the circuit shown in FIG. 2A. FIG. 2A is a schematic circuit of an embodiment of the driving module in FIG. 1. The driving module 1100 includes a driving current source 1110 and a compensation current source 1120. The driving current source 1110 is controlled by a light dimming signal Vdim to produce a first current I01, and the compensation current source 1120 is controlled by the feedback module 1400 to produce a second current I02. The first current I01 is combined with the second current I02 to produce the driving current I0. The light dimming signal Vdim is defined by users. The frequency of the second current I02 is much less than the frequency that the data transmission module transmits data. In some embodiments, in order to avoid data transmission errors, the variation of the second current I02 during two adjacent clock cycles is less than a half of the least significant bit (LSB) of the data current, but the disclosure will not be limited thereto.

Figure 2B:
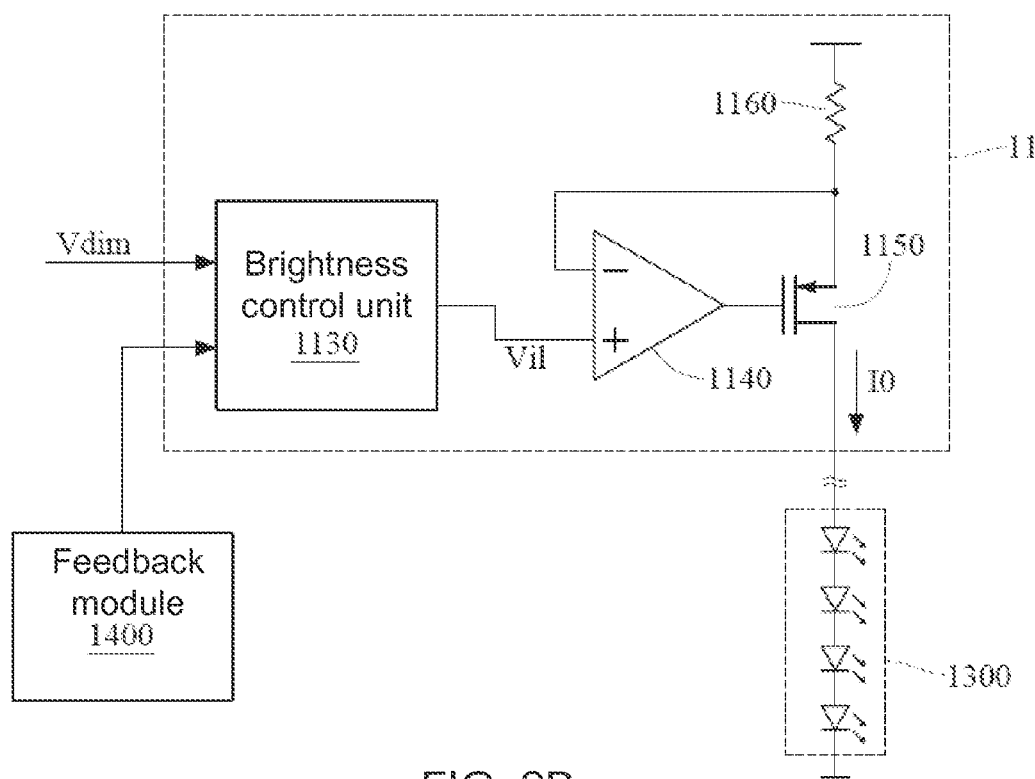
FIG. 2B is a schematic circuit of an embodiment of the driving module in FIG. 1.

In other embodiment, the circuit of the driving module 1100 can be referred to the circuit shown in FIG. 2B. FIG. 2B is a schematic circuit of an embodiment of the driving module in FIG. 1. In this case, the driving module 1100 includes a brightness control unit 1130, an amplifier 1140, a transistor 1150, and an impedance component 1160. The brightness control unit 1130 is controlled by the light dimming signal Vdim to produce a brightness control voltage Vil. A positive input terminal of the amplifier 1140 receives the brightness control voltage Vil, and an output terminal of the amplifier 1140 is electrically connected to a control terminal of three terminals of the transistor 1150. Another one of the three terminals of the transistor 1150 outputs the driving current I0, and the other one of the three terminals of the transistor 1150 is electrically connected to a supply voltage terminal of the optical communication device 1000 through the impedance component 1160. A negative input terminal of the amplifier 1140 is electrically connected to a node where the impedance component 1160 and the transistor 1150 join together. Therefore, the driving current I0 in FIG. 2B is set according to the resistance value of the impedance component 1160 and the brightness control voltage Vil. In this embodiment, when controlling the driving current I0 according to the feedback of the feedback module 1400, the driving module 1100 adjusts the brightness control voltage Vil according to the feedback of the feedback module 1400 via the brightness control unit 1130.

Figure 2C:
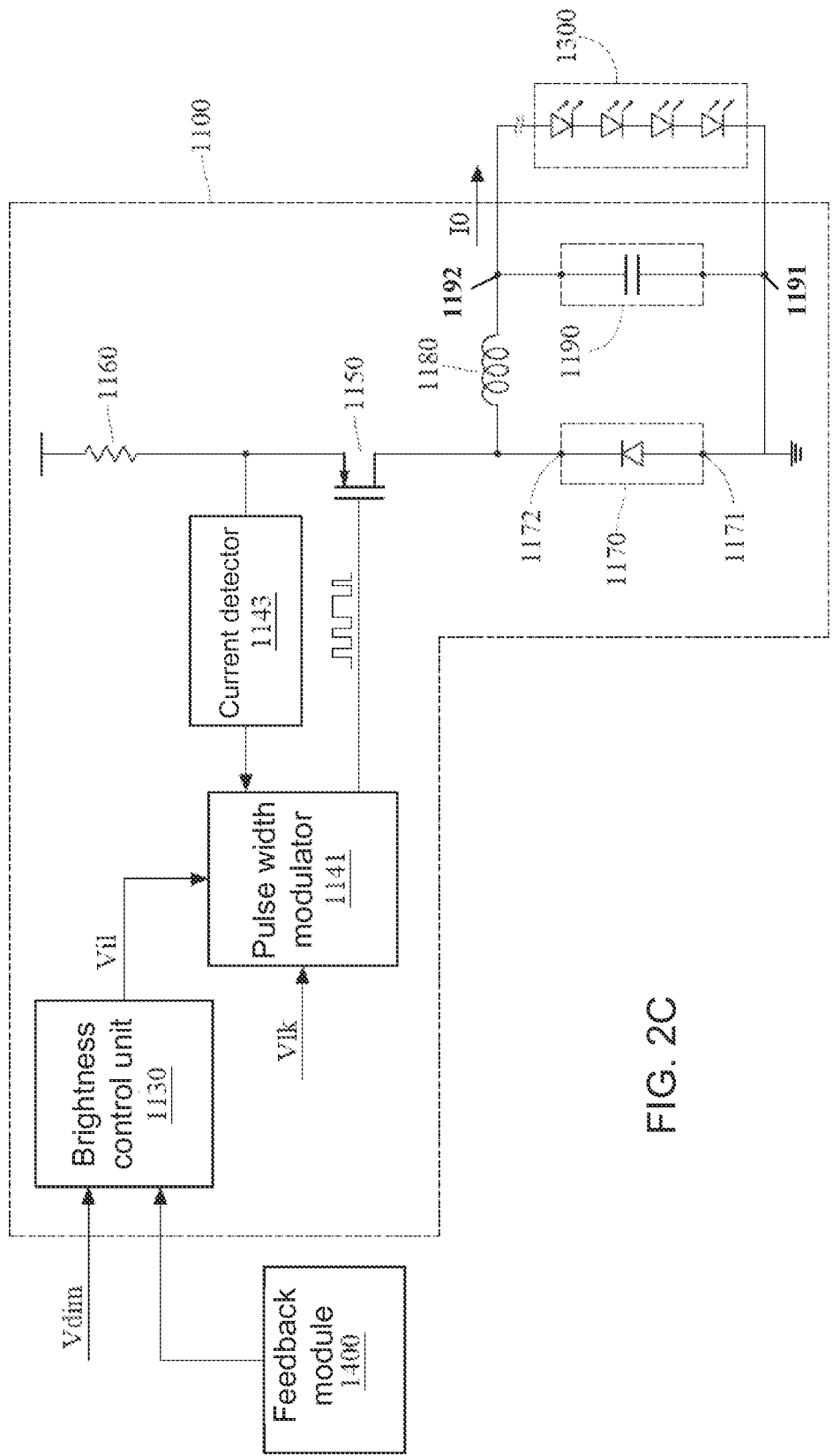
FIG. 2C is a schematic circuit of an embodiment of the driving module in FIG. 1.

In other embodiment, the circuit of the driving module 1100 can be referred to the circuit shown in FIG. 2C. FIG. 2C is a schematic circuit of an embodiment of the driving module in FIG. 1. Compared with the driving module 1100 in FIG. 2B, the driving module 1100 in FIG. 2C further includes an unidirectional component 1170 (such as a diode), an inductor 1180, and a capacitor 1190, and the amplifier 1140 in FIG. 2B is replaced by a pulse width modulator 1141, a current detector 1143, and a transistor 1150 in FIG. 2C. The current detector 1143 calculates an equivalent current value according to the voltage on one terminal of the impedance component 1160 and then provides the pulse width modulator 1141 with the equivalent current value. The pulse width modulator 1141 produces a pulse width modulation (PWM) signal VPWM according to a signal sent from the current detector 1143, the brightness control voltage Vil, and a clock signal Vlk to control the on and off of the transistor 1150. A first terminal 1191 of the capacitor 1190 and a first terminal 1171 of the unidirectional component 1170 are electrically connected to a ground terminal of the optical communication device 1000, and a second terminal 1192 of the capacitor 1190 is electrically connected to one of two terminals of the light emitting module 1300. The capacitor 1190 and the light emitting module 1300 are connected in parallel. A second terminal 1172 of the unidirectional component 1170 is electrically connected to the transistor 1150. The inductor 1180 has two terminals that are electrically connected to the second terminal 1172 of the unidirectional component 1170 and the second terminal 1192 of the capacitor 1190 respectively. Specifically, the transistor 1150 is indirectly and electrically connected to the light emitting module 1300. The current outputted by the transistor 1150 becomes the driving current I0 to drive the light emitting module 1300 after flowing through a low pass filter (LPF) including the unidirectional component 1170, the inductor 1180, and the capacitor 1190. Similar to the embodiment in FIG. 2B, when the driving module 1100 in the FIG. 2C changes the driving current I0 according to the feedback of the feedback module 1400, the brightness control unit 1130 adjusts the brightness control voltage Vil according to the feedback of the feedback module 1400.

Figure 3:
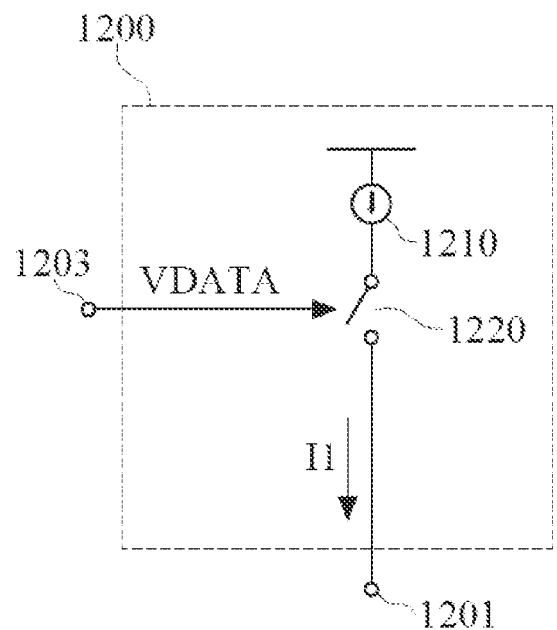
FIG. 3 is a schematic circuit of an embodiment of the data transmission module in FIG. 1.

The data transmission module 1200 generates a data current I1 according to a piece of data. The data transmission module 1200, for example, transmits data to be transmitted one bit by one bit by a serial communication until the data transmission finishes, as shown in FIG. 3. FIG. 3 is a schematic circuit of an embodiment of the data transmission module in FIG. 1. The data transmission module 1200 includes a data current source 1210 and a switch 1220. The switch 1220 has two terminals electrically connected to the data current source 1210 and an output terminal 1201 of the data transmission module 1200 respectively. The switch 1220 is selectively turned on according to a data signal VDATA sent from an input terminal 1203 of the data transmission module 1200. In the case of a N type transistor as the switch 1220, when the data signal VDATA is at a high potential, the switch 1220 will be on, Therefore, the data current I1 sent from the output terminal 1201 of the data transmission module 1200 is equal to a rated current of the data current source 1210. Otherwise, when the data signal VDATA is at a low potential, the switch 1220 will be off. Therefore, the current value of the data current I1 sent from the output terminal 1201 of the data transmission module 1200 is zero.

Figure 4:
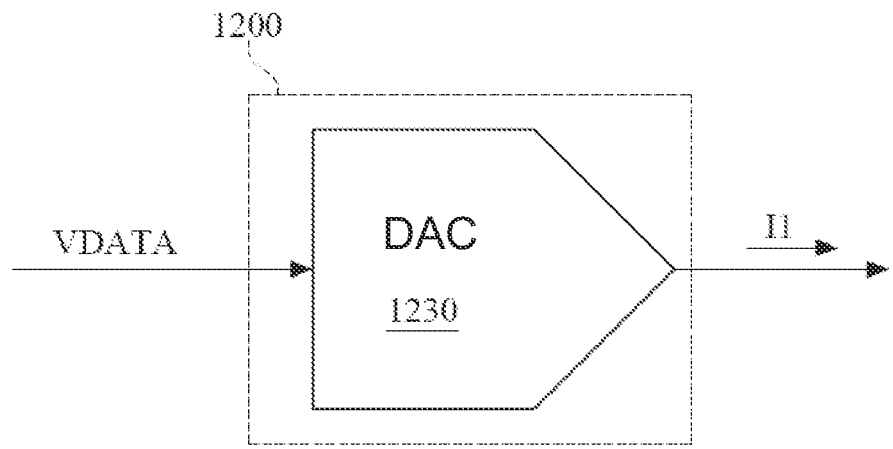
FIG. 4 is a schematic circuit of an embodiment of the data transmission module in FIG. 1.
Figure 5:
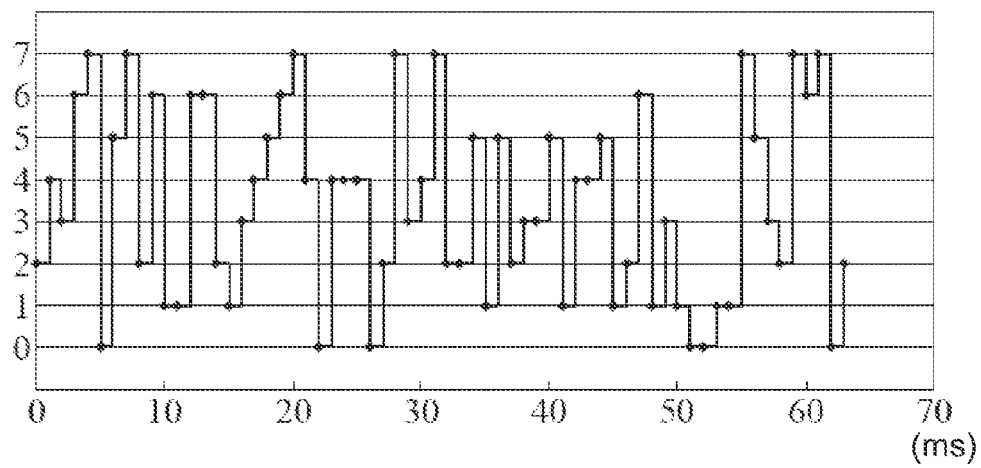
FIG. 5 is a time sequence diagram of an embodiment of a data current in the disclosure.

Alternately, the data transmission module 1200, for example, transmits multiple bits of data to be transmitted every time until the data transmission finishes, as shown in FIG. 4. FIG. 4 is a schematic circuit of an embodiment of the data transmission module in FIG. 1. In this case, the data transmission module 1200 includes a current type digital to analog converter (Current type DAC) 1230. The DAC 1230 outputs the data current I1 at various potentials (i.e. different current values) according to the data signal VDATA. For example, the data current I1 outputted by the data transmission module 1200 is shown in FIG. 5. FIG. 5 is a time sequence diagram of an embodiment of a data current in the disclosure.

The light emitting module 1300 emits visible light according to an illuminating current IE obtained by combining the driving current I0 with the data current I1. Since the response time of the light emitting module 1300 (i.e. the time period that the illuminating current IE flows into and drives the light emitting module 1300 to emit the visible light) affects the data transmission efficiency of the optical communication device 1000, the light emitting module 1300 includes, for instance, light emitting diodes (LED), Organic light emitting diodes (OLED), or other lamination components having a short response time.

The feedback module 1400 adjusts a DC potential of the driving current JO such that the visible light emitted by the light emitting module has an average intensity equal to a preset intensity. Particularly, the feedback module 1400 includes a visible light detection unit. The visible light detection unit detects the intensity of the emitted visible light and sends the intensity of the visible light to the driving module 1100 such that the driving module 1100 can adjust the DC potential of the driving current I0. For instance, the visible light detection unit is a charge coupled device (CCD) or a complementary metal-oxide semiconductor field-effect transistor (CMOS) photosensitive component.

Figure 6:
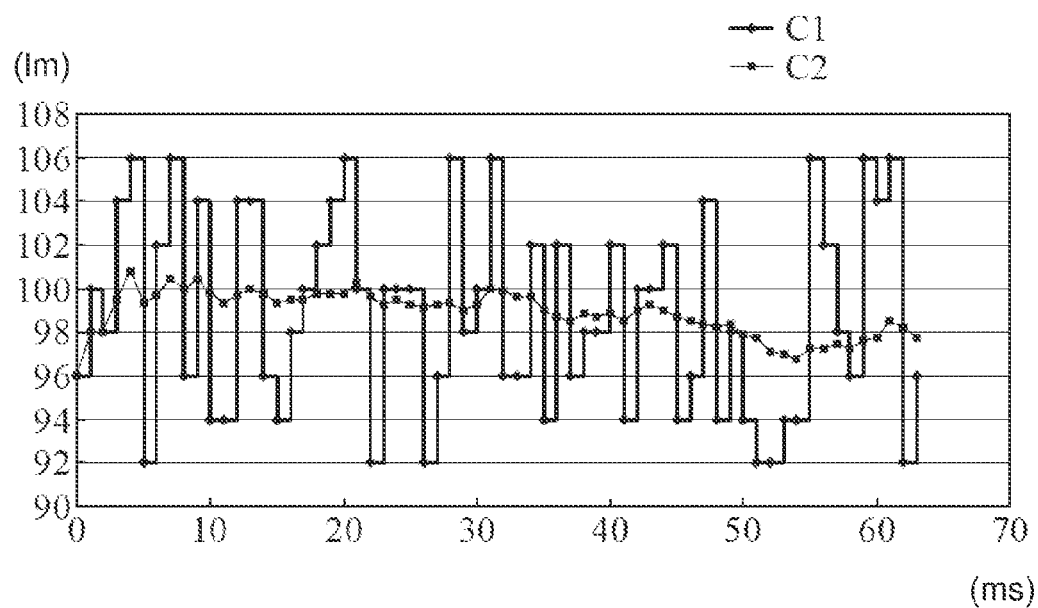
FIG. 6 is a time sequence diagram illustrating the relationship between the intensity and the average intensity.

In practice, the average intensity is generated by, for example, averaging the intensity of the aforementioned visible light detected by the visible light detection unit during a time period. Alternately, the average intensity is obtained by, for example, a moving average method. FIG. 6 is a time sequence diagram illustrating the relationship between the intensity and the average intensity. As shown in FIG. 6, a first curve C1 indicates intensities, and a second curve C2 indicates average intensities at each time point. The average intensity is obtained by sampling and averaging the last 16 intensities by the moving average method. Since human eyes can not sense that the brightness changes by more than 120 Hz, the intensities during the last 1/120 second can be sampled and then be averaged by the moving average method to obtain the average intensity. In some embodiments, the time period is, for example, shorter than 1/120 second.

Figure 7:
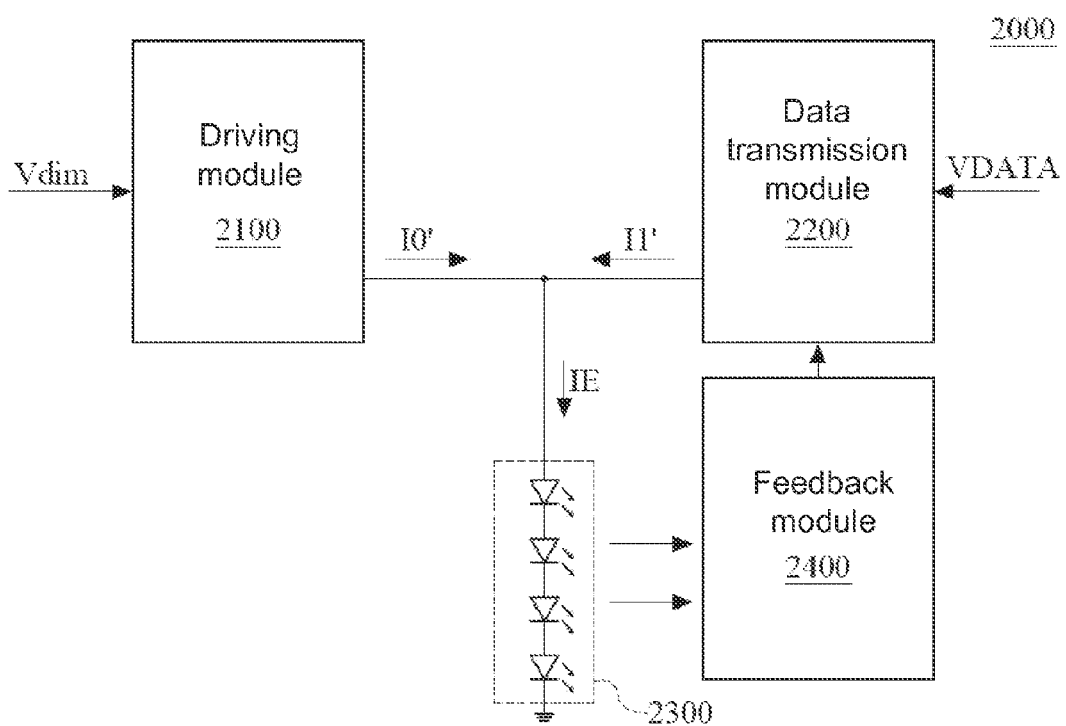
FIG. 7 is a functional block diagram of an embodiment of an optical communication device in the disclosure.

In another embodiment of the optical communication device, the feedback module is electrically connected to a data transmission module rather than a driving module. FIG. 7 is a functional block diagram of an embodiment of an optical communication device in the disclosure. An optical communication device 2000 includes a driving module 2100, a data transmission module 2200, a light emitting module 2300, and a feedback module 2400. The light emitting module 1300 is electrically connected to the driving module 2100 and the data transmission module 2200 directly. The feedback module 2400 is electrically connected to the data transmission module 2200.

The operation of the light emitting module 2300 and feedback module 2400 is quiet similar to the operation of the light emitting module 1300 and feedback module 1400 in FIG. 1. However, the feedback module 2400 is electrically connected to the data transmission module 2200 to control the DC potential of the data current. The differences between the driving module 2100 and the driving module 1100 and between the data transmission module 2200 and the data transmission module 1200 in FIG. 1 in operation are described as follows.

Figure 8:
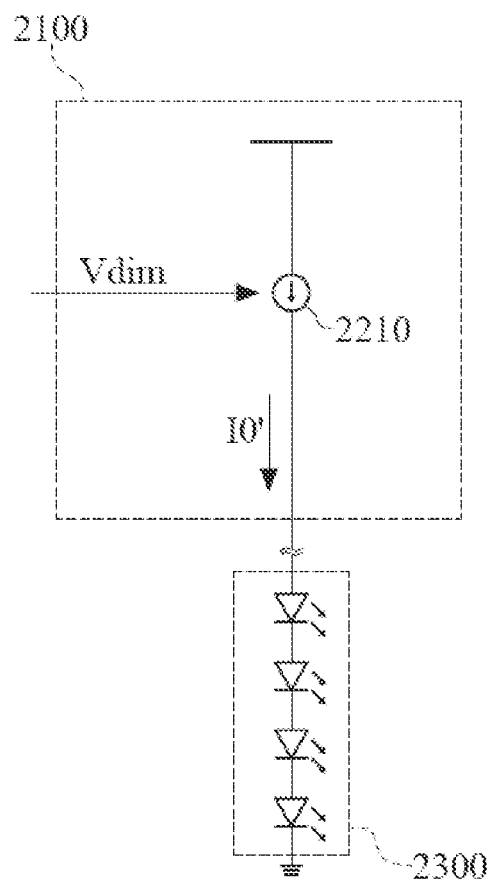
FIG. 8 is a schematic circuit of an embodiment of the driving module in FIG. 7.
Figure 9:
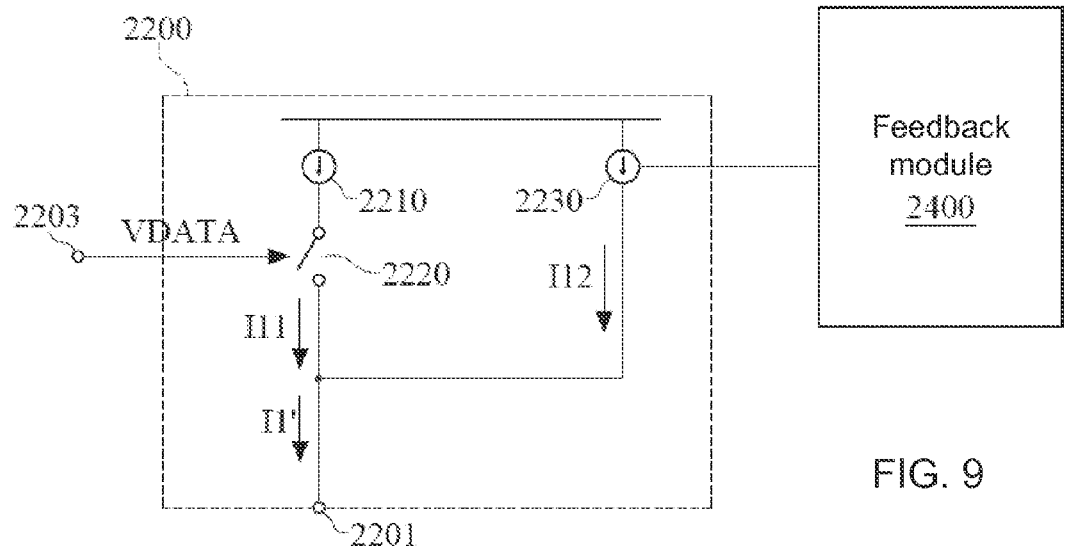
FIG. 9 is a schematic circuit of an embodiment of the data transmission module in FIG. 7.

The driving module 2100 produces a driving current I0', as shown in FIG. 8. FIG. 8 is a schematic circuit of an embodiment of the driving module in FIG. 7. The driving module 2100 includes a driving current source 2110. The driving current source 2110 produces a driving current I0' according to a light dimming signal Vdim defined by users. The data transmission module 2200 produces a data current I1' according to a piece of data. For example, the data transmission module 2200 transmits data to be transmitted one bit by one bit by a serial communication method until the data transmission finishes. In this case, the circuit of the data transmission module 2200 can be referred to the circuit in FIG. 9. FIG. 9 is a schematic circuit of an embodiment of the data transmission module in FIG. 7. The data transmission module 2200 includes a data current source 2210, a switch 2220, and a compensation current source 2230. The switch 2220 has two terminals electrically connected to the data current source 2210 and an output terminal 2201 of the data transmission module 2200 respectively. The switch 2220 is selectively on according to a data signal VDATA sent by an input terminal 2203 of the data transmission module 2200. The compensation current source 2230 is electrically connected to the feedback module 2400 such that the compensation current source 2230 adjusts a compensation current I12 according to the feedback of the feedback module 2400. In the case of using a N type transistor as the switch 2220, when the data signal VDATA is at a high potential, the switch 2220 is on whereby the current value of the data current I1' outputted by an output terminal 2201 of the switch 2220 is equal to the current I11 outputted by the data current source 2210 plus the compensation current I12. Otherwise, when the data signal VDATA is at a low potential, the switch 2220 is off whereby the current value of the data current I1' outputted by the output terminal 2201 of the switch 2220 is equal to that of the compensation current I12.

Figure 10:
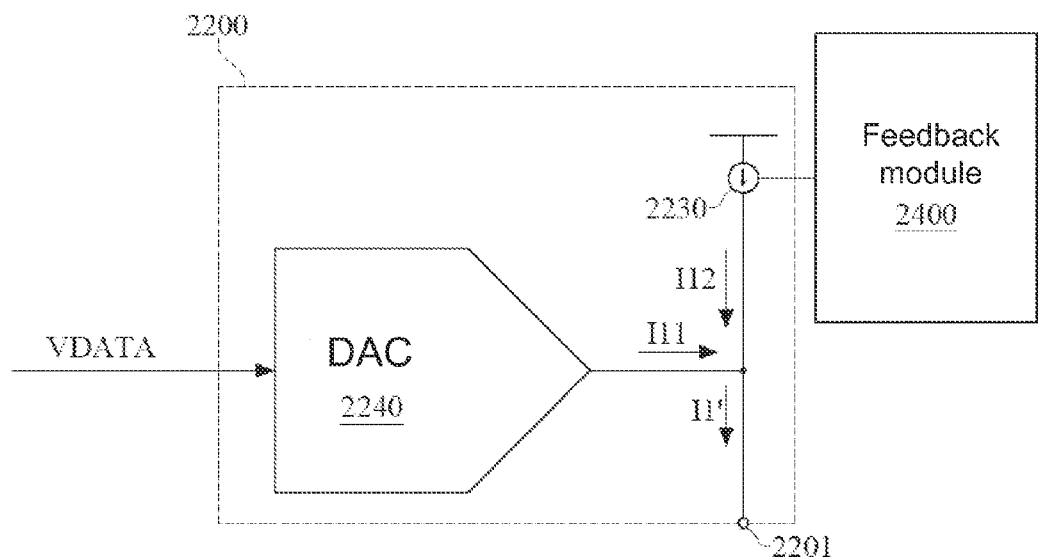
FIG. 10 is a schematic circuit of an embodiment of the data transmission module in FIG. 7.

Alternately, the data transmission module 2200 transmits multiple bits of data to be transmitted every time until the data transmission finishes. In this case, the circuit of the data transmission module 2200 can be referred to the circuit in FIG. 10. FIG. 10 is a schematic circuit of an embodiment of the data transmission module in FIG. 7. The data transmission module 2200 includes a compensation current source 2230 and a current type DAC 2240. The compensation current source 2230 and the DAC 2240 are electrically connected to the output terminal 2201 of the data transmission module 2200. The DAC 2240 outputs a current I11 having different potentials (i.e. current values) according to data. The compensation current source 2230 is electrically connected to the feedback module 2400 such that the compensation current source 2230 adjusts the compensation current I12 according to the feedback of the feedback module 2400. The combination of the current I11 and the compensation current I12 is the data current I1'. The frequency of the compensation current I12 is much less than the frequency that the data transmission module transmits data. In some embodiments, in order to avoid data transmission errors, the variation of the compensation current I12 during two adjacent clock cycles is less than a half of the least significant bit (LSB) of the current I11.

Figure 11A:
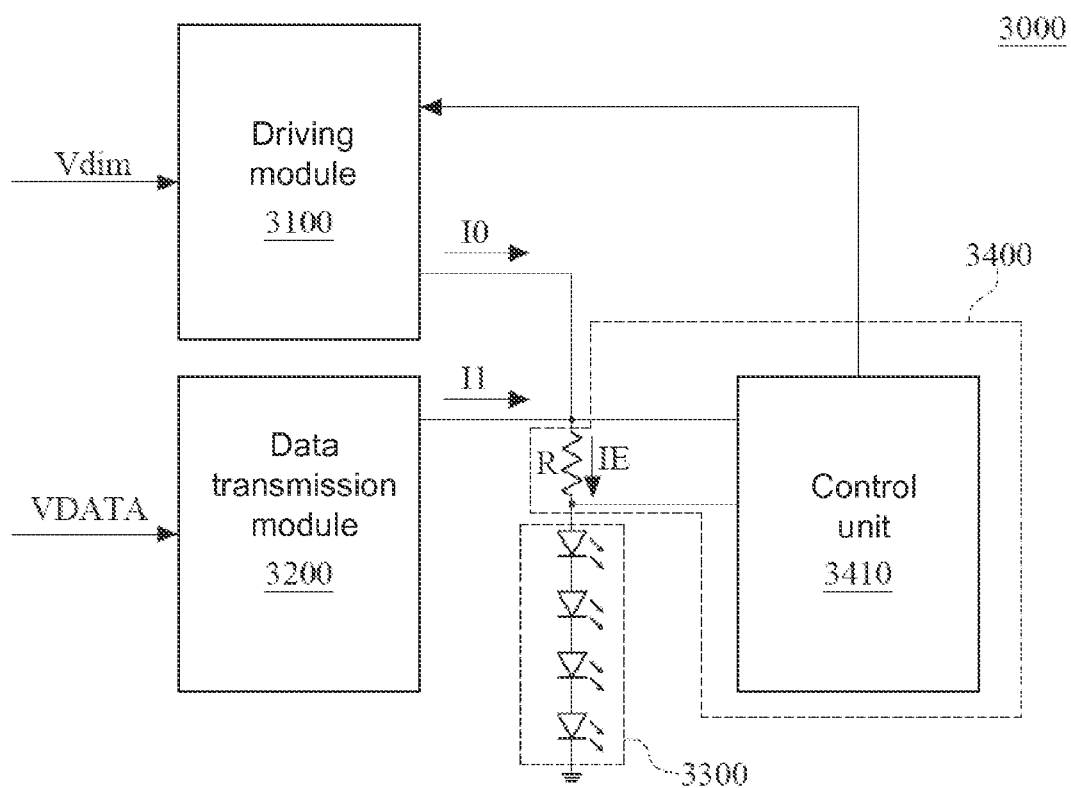
FIG. 11A is a functional block diagram of an embodiment of an optical communication device in the disclosure.
Figure 11B:
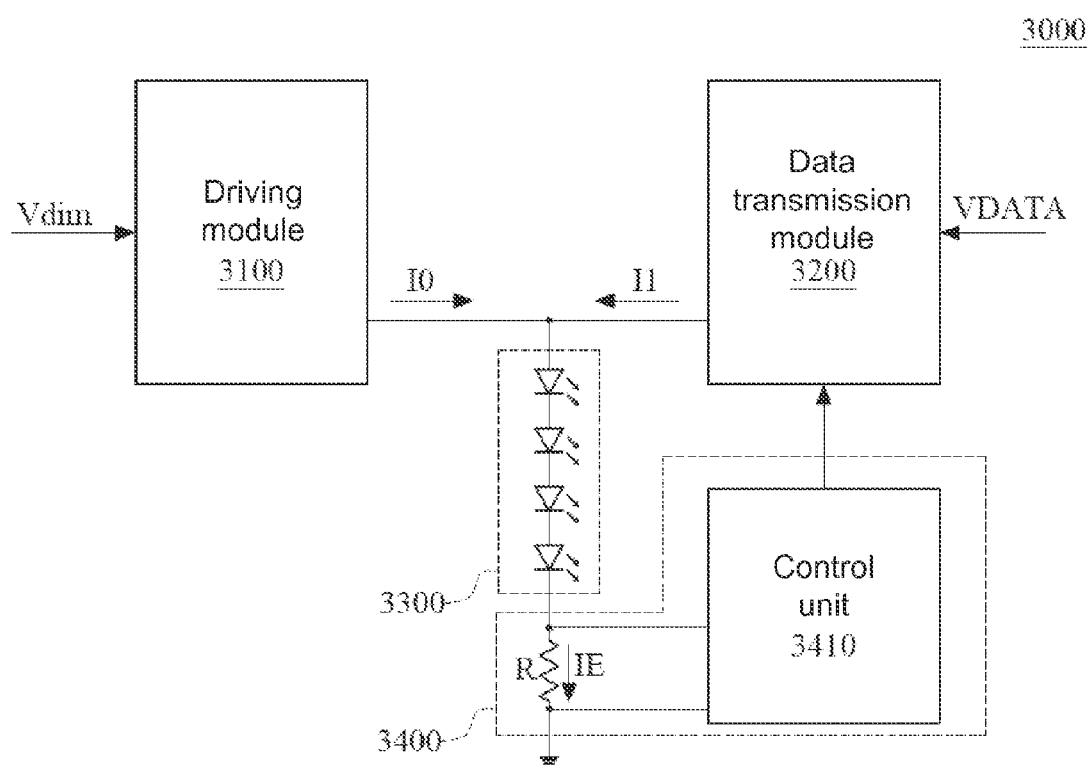
FIG. 11B is a functional block diagram of an embodiment of an optical communication device in the disclosure.

On the other hand, since the intensity of the visible light of the light emitting module is directly proportional to the illuminating current to drive the light emitting module, the feedback module can measure or detect the illuminating current and then control the DC potential of the driving current or the data current according to the detection result. Please refer to FIGS. 11A and 11B. FIG. 11A is a functional block diagram of an embodiment of an optical communication device in the disclosure, and FIG. 11B is a functional block diagram of an embodiment of an optical communication device in the disclosure. An optical communication device 3000 includes a driving module 3100, a data transmission module 3200, a light emitting module 3300, and a feedback module 3400. The light emitting module 3300 is electrically connected to the driving module 3100 and the data transmission module 3200 directly. As shown in FIG. 11A, the feedback module 3400 is electrically connected to the driving module 3100. As shown in FIG. 11B, the feedback module 3400 is electrically connected to the data transmission module 3200. The operation of the driving module 3100, data transmission module 3200 and the light emitting module 3300 can be referred to the description of the aforementioned embodiments and thus, will not be repeated hereinafter.

In FIGS. 11A and 11B, the feedback module 3400 includes a resistor R connected to the light emitting module 3300 in series, and a control unit 3410. Particularly, the feedback module 3400 detects the potential difference between two terminals of the resistor R via the control unit 3410 in order to calculate the current value of the illuminating current IE passing through the light emitting module 3300 at each time point. Furthermore, by the aforementioned moving average method, the control unit 3410 calculates an average current value of the illuminating current IE during a time period and calculates an average intensity of the visible light emitted by the light emitting module 3300. The control unit 3410 controls the DC potential of the driving current or the data current according to average intensity of the emitted visible light.

In practice, the average intensity of the visible light is estimated according to the average value obtained by averaging the illuminating current IE by the control unit 3410 during a time period. Alternatively, the average intensity of the visible light is obtained by averaging the illuminating current IE in the moving average method. Since human eyes can not sense that the brightness changes by more than 120 Hz, the intensities during the last 1/120 second can be sampled and then be averaged by the moving average method to obtain the average value of the illuminating current IE. In some embodiments, the time period is, for example, shorter than 1/120 second.

Figure 12:
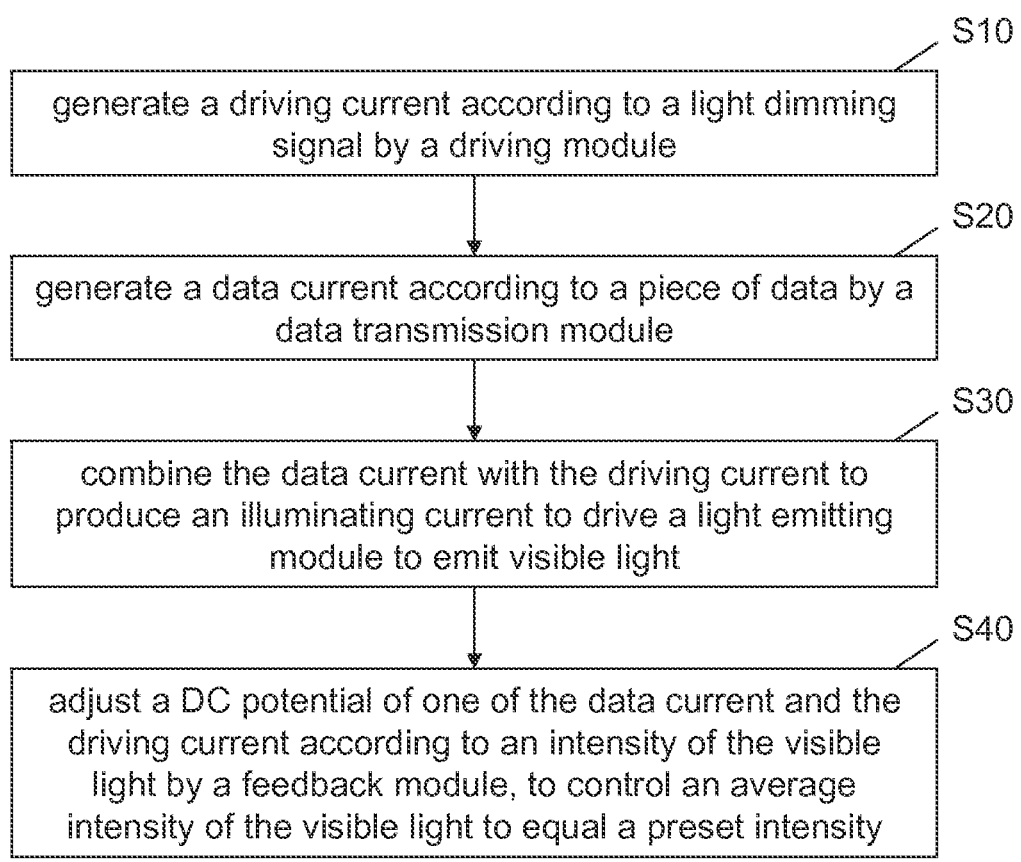
FIG. 12 is a flow chart of an embodiment of a control method for an optical communication device in the disclosure.

Accordingly, a control method for the above optical communication device can be summarized as shown in FIG. 12 which is a flow chart of an embodiment of a control method for an optical communication device in the disclosure. The control method includes the following steps. In step S10, generate a driving current according to a light dimming signal by a driving module. In step S20, generate a data current according to a piece of data by a data transmission module. In step S30, combine the data current with the driving current to produce an illuminating current to drive a light emitting module to emit visible light. In step S40, adjust a DC potential of one of the data current and the driving current according to an intensity of the visible light by a feedback module, to control an average intensity of the visible light to equal a preset intensity.

In view of the above embodiments in the disclosure, the optical communication device converts the data to be transmitted into the data current and combines the data current with the driving current by a directly coupling manner to produce the illuminating current to drive the light emitting module. Moreover, the optical communication device controls the DC potential of one of the driving current and the data current by a feedback manner. Therefore, the variation of the brightness of the emitted visible light may decrease in the low frequency part, and users may not sense the flickers when the disclosure is applied to the indoor illumination.

What is claimed is:

1. An optical communication device, comprising:
   a driving circuit configured to output a driving current;
   a data transmission circuit configured to generate a data current according to a piece of data;
   a light emitting diode electrically connected to the driving circuit and the data transmission circuit, configured to emit visible light according to an illuminating current that is generated by combining the driving current with the data current; and
   a feedback module configured to adjust a direct current (DC) potential of one of the driving current and the data current to set an average intensity of the visible light to be a preset intensity;
   wherein the feedback module is electrically connected to the driving circuit and comprises a visible light detection unit configured to detect an intensity of the visible light emitted by the light emitting diode, and controls the driving circuit to adjust the DC potential of the driving current according to the intensity of the visible light, the feedback module is electrically connected to the data transmission circuit and the light emitting diode and controls the data transmission circuit to adjust the DC potential of the data current according to the illuminating current.

2. The optical communication device according to claim 1, wherein the average intensity is obtained by averaging the illuminating current during a time period.

3. The optical communication device according to claim 2, wherein the time period is shorter than or equal to 1/120 second.

4. The optical communication device according to claim 2, wherein the average intensity is measured by a moving average method via the feedback module.

5. The optical communication device according to claim 1, wherein the average intensity is obtained by averaging the intensity of the visible light during a time period.

6. The optical communication device according to claim 5, wherein the time period is shorter than or equal to 1/120 second.

7. The optical communication device according to claim 5, wherein the average intensity is measured by a moving average method via the visible light detection unit.

8. An optical communication device, comprising:
   a driving circuit configured to output a driving current;
   a data transmission circuit configured to generate a data current according to a piece of data;
   a light emitting diode electrically connected to the driving circuit and the data transmission circuit, configured to emit visible light according to an illuminating current that is generated by combining the driving current with the data current; and
   a feedback module configured to adjust a direct current (DC) potential of one of the driving current and the data current to set an average intensity of the visible light to be a preset intensity;
   wherein the feedback module is electrically connected to the driving circuit and comprises a visible light detection unit configured to detect an intensity of the visible light emitted by the light emitting diode, and controls the driving circuit to adjust the DC potential of the driving current according to the intensity of the visible light, the feedback module is electrically connected to the data transmission circuit and controls the data transmission circuit to adjust the DC potential of the data current according to the intensity of the visible light.

9. The optical communication device according to claim 8, wherein the average intensity is obtained by averaging the intensity of the visible light during a time period.

10. The optical communication device according to claim 9, wherein the time period is shorter than or equal to 1/120 second.

11. The optical communication device according to claim 9, wherein the average intensity is measured by a moving average method via the visible light detection unit.

12. A control method for an optical communication device, comprising:
    generating a driving current by a driving circuit;
    generating a data current, by a data transmission circuit, according to a piece of data;
    driving a light emitting diode by an illuminating current generated by combining the data current with the driving current, to emit visible light; and
    adjusting a DC potential of one of the data current and the driving current to set an average intensity of the visible light to be a preset intensity by a feedback module;
    wherein the average intensity is obtained by averaging the illuminating current during a time period, and the DC potential of the data current is adjusted according to the illuminating current by the feedback module.

13. The control method according to claim 12, wherein the time period is shorter than or equal to 1/120 second.

14. The control method according to claim 12, wherein the average intensity is measured by a moving average method.

15. A control method for an optical communication device, comprising:

generating a driving current by a driving circuit;
generating a data current, by a data transmission circuit, according to a piece of data;
driving a light emitting diode by an illuminating current generated by combining the data current with the driving current, to emit visible light; and
adjusting a DC potential of one of the data current and the driving current to set an average intensity of the visible light to be a preset intensity by a feedback module;
wherein the average intensity is obtained by averaging the intensity of the visible light during a time period, and the DC potential of the data current is adjusted according to the illuminating current by the feedback module.

16. The control method according to claim 15, wherein the time period is shorter than or equal to $1/120$ second.

17. The control method according to claim 15, wherein the average intensity is measured by a moving average method.

* * * * *